United States Patent [19]

Agarwal et al.

[11] 4,148,615
[45] Apr. 10, 1979

[54] PREVENTION OF SCALE FORMATION IN WET LIME SCRUBBERS

[75] Inventors: Jagdish C. Agarwal, Concord; Richard A. Giberti, Waltham; Louis J. Petrovic, Sudbury, all of Mass.

[73] Assignee: Kennecott Copper Corporation, New York, N.Y.

[21] Appl. No.: 672,021

[22] Filed: Mar. 30, 1976

Related U.S. Application Data

[63] Continuation of Ser. No. 537,209, Dec. 30, 1974, abandoned.

[51] Int. Cl.² .............................................. B01D 53/14
[52] U.S. Cl. .......................................... 55/73; 55/89; 210/57
[58] Field of Search ................... 55/68, 73, 89, 93, 94; 210/57

[56] References Cited

U.S. PATENT DOCUMENTS

| | | | |
|---|---|---|---|
| 1,599,490 | 9/1926 | Richter et al. | 55/73 |
| 2,013,753 | 9/1935 | Hahn | 55/73 X |
| 2,598,116 | 5/1952 | DuBois | 55/73 |

OTHER PUBLICATIONS

Flue Gas Desulfurization, Joy Manufacturing Co., 6/1972.
Operation of a Limestone Wet Scrubber, D. C. Gifford, Chemical Eng. Progress, vol. 69, No. 6, 6/1973, pp. 86-92.
Betz Handbook of Industrial Water Conditioning, 5th Edition, 1957, pp. 152-154.

Primary Examiner—Robert H. Spitzer

[57] ABSTRACT

Proper cooling of fossil fuel power plant or smelter reverberatory furnace off gases for removal of sulfur dioxide by proper contacting of the same with lime or limestone, including the recycling of the scrubbing liquor.

3 Claims, 3 Drawing Figures

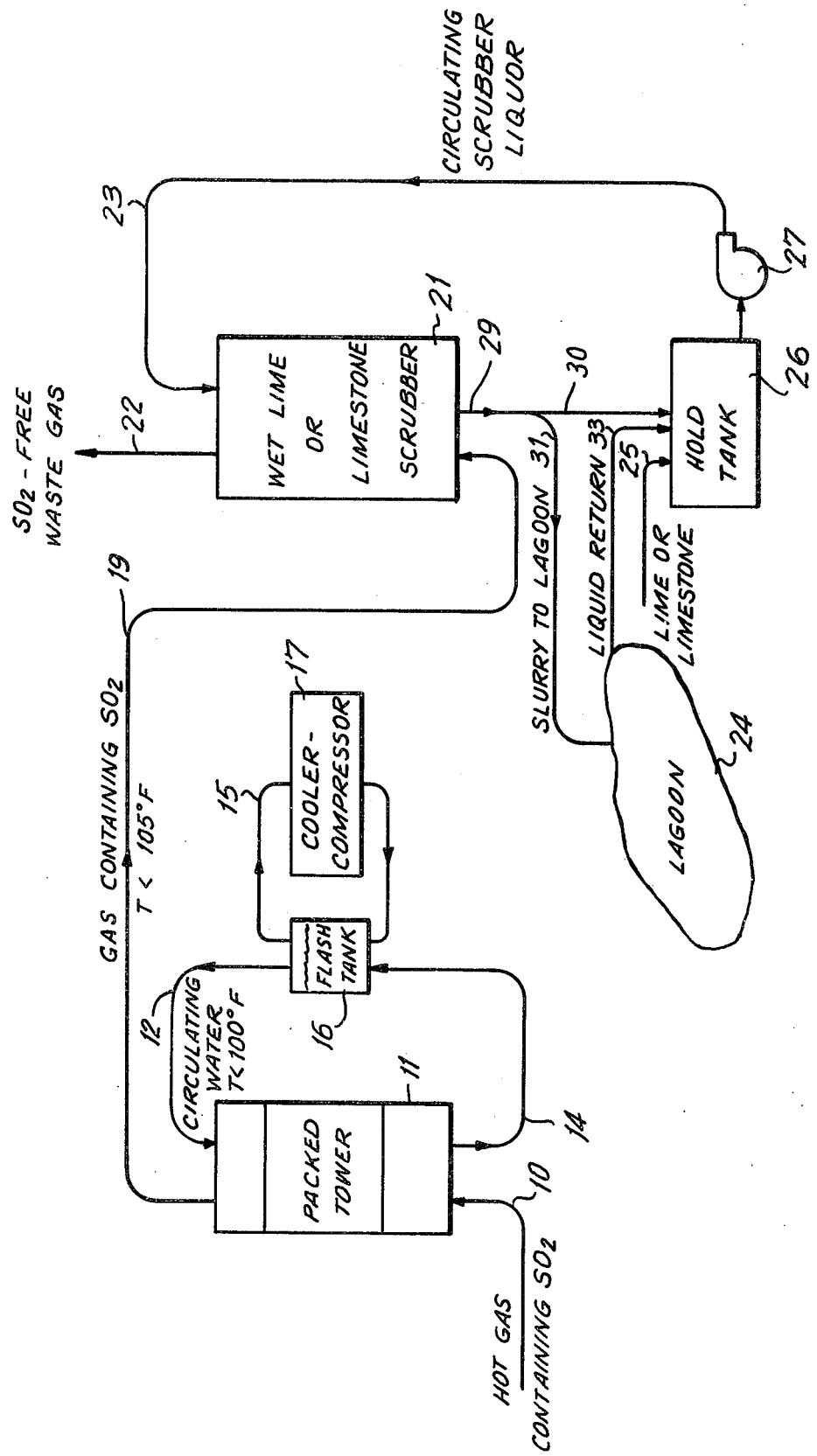

PREVENTION OF SCALE FORMATION IN WET LIME SCRUBBERS

This is a continuation of application Ser. No. 537,209, filed Dec. 30, 1974, and now abandoned.

This invention pertains to a method for reducing scale formation in wet lime and limestone sulfur dioxide scrubbers; more particularly, this invention pertains to a method for improving air quality standards by providing a less troublesome sulfur dioxide removal from power plant stack gases or reverberatory furnace waste gases. Still further, this invention pertains to a method for operating a wet lime or limestone scrubber for the purpose of obtaining a substantially completely sulfur dioxide free flue or furnace gas.

BACKGROUND OF THE INVENTION

With increasingly stricter air quality standards being imposed in various communities and with increasingly greater energy needs experienced, it has become necessary to utilize all available sources of energy. One of the most plentiful sources of energy is coal found in deposits in numerous locations. Although coal has been used for many purposes, it has been gradually displaced by employing oil as an alternative fuel, because oil can be more readily purified.

In general, the most objectionable aspect when using coal has been air quality criteria which must be met when coal is burned. The combustion effluents or gases of coal such as high sulfur coal are laden with sulfur dioxide, the removal of which becomes fairly complex at the high flow rates and flue gas temperatures encountered such as in normal coal power plant boilers. For purposes of the present invention a high sulfur coal is defined as coal having more than 0.5% by weight of sulfur present.

Still further, in operating reverberatory furnaces, such as in smelters, the waste gases from these furnaces contain considerable amounts of sulfur dioxide. Waste gases from these furnaces contain from 0.5 to 3.5% of sulfur dioxide, by volume. In general, the sulfur dioxide from these combustion sources might be removed by a lime or limestone reaction by various processes and apparatus, numerous disclosures of which exist in the patent art literature. However, in contacting the sulfur dioxide laden flue gases in a wet lime or limestone scrubber, scale formations and encrustation of the apparatus are observed which render the apparatus employed for scrubbing of the flue gas useless after a short duration, requiring frequent shutdowns or an alternate apparatus to which the flue gas stream can be switched while scale and encrustations are removed from the substantially inoperative apparatus.

BRIEF DESCRIPTION OF THE PRIOR ART

In attempting to prevent the encrustation of the apparatus as well as improve contact between the waste gases, various proposals have been made such as adding an acid to an aqueous slurry of calcium, barium or magnesium carbonate or oxide. An illustrative disclosure is found in U.S. Pat. No. 3,632,306. Another method has been disclosed in U.S. Pat. No. 3,520,649 in which power plant flue gases are countercurrently scrubbed with alkaline scrubbing stream in the presence of self-cleaning mobile contact elements. It is fairly evident that the emphasis in this patent has been on the "self-cleaning" feature of the invention. A pertinent prior art reference in respect to sulfur dioxide removal from waste gases in Slack, A.V., "Sulfur Dioxide Removal from Waste Gases", pages 42–85, Noyes Data Corporation, 1971.

In another method described in U.S. Pat. No. 3,775,094 a slurry of calcium sulfate is used at 50 to 100° F to absorb the sulfur dioxide. The resulting slurry is then heated to 150 to 210° F to separate sulfur dioxide gas and regenerate the calcium sulfate slurry.

Still further, in U.S. Pat. No. 3,556,722 a process has been disclosed for treating exhaust gases containing sulfurous or sulfuric acid gas with a suspension of hydroxide or carbonate of calcium to produce the corresponding sulfite and/or sulfate. Again, waste sulfuric acid has been added to the liquid so that the sulfite may be converted to the corresponding sulfate.

BRIEF DESCRIPTION OF THE INVENTION

It has now been found that in the process of prevention of scale formation in wet lime or limestone scrubbers, a combination useful for avoiding the prior art problems of scale formation has been found and the improvement has resulted in a substantial advantage for utilizing sulfur containing coals.

In accordance with the process, it has been found that if a hot gas containing sulfur dioxide is precooled in a circulating water tower to a temperature less than 105° F and the thus precooled sulfur dioxide containing gas is thereafter contacted in a wet lime or a limestone scrubber by a scrubbing liquid with makeup water from a storage lagoon kept at ambient temperature, the temperature at which the wet limestone or lime scrubber is operated prevents the scale formation and encrustation. Consequently, the present process provides for increased operating efficiency of scrubbers, as well as for a plant employing coal as a source of energy.

DESCRIPTION OF THE DRAWINGS

With reference to the drawing illustrating the invention and not limiting the scope thereof:

The sole FIGURE shows the method for reducing the scale formation in wet lime and limestone sulfur dioxide scrubbers.

In accordance with the FIGURE, a hot flue gas contains sulfur dioxide and has the following analysis: $SO_2$ — 0.3%; $CO_2$ — 13.7%; $O_2$ — 4.7%; $N_2O$ — 4.5%; $N_2$ — 76.8%. The above gas is introduced in a packed tower at a rate of 140,000 scfm whereby a packing such as Raschig rings, saddle packings, drip point grid, etc. are contacted with the circulating water at less than 100° F. in a countercurrent fashion. The circulating water is introduced in the packed tower 11, via line 12. The return line of the circulating water has been designated as 14. A flash tank 16, cools the circulating water to a suitable temperature (as measured in line 12) either indirectly by coils or by direct contact with coolant from cooler-compressor 17. The packed tower effluent gases containing sulfur dioxide in line 19 are introduced in the wet lime or limestone scrubber 21 conventional in the art such as illustrated in the above-mentioned A. V. Slack article which describes a wet lime or limestone scrubber. In scrubber 21, the sulfur free waste gases are vented via line 22 to atmosphere. The circulating scrubbing liquor in line 23 is obtained from a lagoon 24 and augmented by lime or limestone via line 25, and introduced in holding tank 26. The holding tank is appropriately maintained in agitation and the liquid from holding tank 26 is pumped via line 23 by means of pump 27 in a countercurrent fashion into the wet lime or limestone scrubber 21.

The downcoming scrubbing liquor laden with the reaction product formed in the wet lime or limestone scrubber is removed from the same via line 29 and introduced into a holding tank via line 30 with a portion of the slurry introduced in the lagoon 24 via line 31. After the slurry has settled in the lagoon, the liquid is returned to the holding tank 26 such as by pumping the same from it via line 33.

An appropriate material and energy balance is illustrated in the following two Tables showing the components of the incoming gas and the heat content of the various streams with reference to the streams in the FIGURE. The FIGURE is thus self-explanatory and illustrates the two embodiments of this invention.

contacted at the higher temperature cause scaling because of the inverse solubility of the calcium sulfite and sulfate being formed between the sulfur dioxide and the limestone or lime introduced in the scrubber as a slurry, e.g., a milk of lime.

Thus, according to the prior art processes, the returned saturated liquor normally becomes supersaturated upon heating to the scrubbing liquor circulating temperatures. This supersaturation has been reduced and the consequent scaling is not encountered when the scrubbing liquid temperature is close to that of the returning lagoon liquor. In the prior art, scaling is more severe in the winter when the returning lagoon liquor is cold and there is a greater change in the liquor temperature upon entering the scrubbing section. According to this disclosure, the lagoon liquor is closer to the scrub-

TABLE I

Design Data for Lime Scrubbing
(PLEASE REFER TO THE FIGURE TO IDENTIFY THE STREAM NUMBERS)

| Material lb/hr | Stream 10 | 15 | 19 | 22 | | | | |
|---|---|---|---|---|---|---|---|---|
| $SO_2$ | 4,490 | — | 4,490 | 490 | | | | |
| $CO_2$ | 140,810 | — | 140,810 | 140,810 | | | | |
| $O_2$ | 35,230 | — | 35,230 | 35,130 | | | | |
| $H_2O$ | 18,980 | — | 32,550 | 32,550 | | | | |
| $N_2$ | 251,300 | — | 251,300 | 251,300 | | | | |
| Propane | — | 123,660 | — | — | | | | |
| Total | 450,810 | 123,660 | 464,380 | 460,280 | | | | |
| Temp., °F | 390 | — | 105 | 105 | | | | |

| | 12 | 13 | 14 | 23 | 25 | 29 | 30 | 31 | 33 |
|---|---|---|---|---|---|---|---|---|---|
| CaO | — | — | — | — | 4,318 | — | — | — | — |
| $Ca(OH)_2$ | — | — | — | 61,481 | — | 56,683 | 55,775 | 1,088 | — |
| $CaSO_3.\frac{1}{2}H_2O$ | — | — | — | 371,932 | — | 379,177 | 371,922 | 7,255 | 10 |
| $CSO_4.2H_2O$ | — | — | — | 67,550 | — | 68,623 | 67,310 | 1,313 | 240 |
| $H_2O$ | 1,845,530 | 13,570 | 1,831,960 | 5,535,544 | — | 5,536,932 | 5,430,991 | 105,941 | 105,941 |
| Total | 1,845,530 | 13,570 | 1,831,960 | 6,036,507 | 4,318 | 6,041,595 | 5,925,998 | 115,597 | 106,191 |
| Temp., °F | 100 | 85 | 110 | 105 | 85 | 105 | 105 | 105 | 85 |

TABLE 2

Design Data for Limestone Scrubbing
(PLEASE REFER TO THE FIGURE TO IDENTIFY THE FIGURE NUMBERS)

| Material lb/hr | Stream 10 | 15 | 19 | 22 | | | | |
|---|---|---|---|---|---|---|---|---|
| $SO_2$ | 4,490 | — | 4,490 | 490 | | | | |
| $CO_2$ | 140,810 | — | 140,810 | 143,550 | | | | |
| $O_2$ | 35,230 | — | 35,230 | 35,130 | | | | |
| $H_2O$ | 18,980 | — | 32,550 | 32,550 | | | | |
| $N_2$ | 251,300 | — | 251,300 | 251,300 | | | | |
| Propane | — | 123,660 | — | — | | | | |
| Total | 450,810 | 123,660 | 464,380 | 463,020 | | | | |
| Temp., °F | 390 | — | 105 | 105 | | | | |

| | 12 | 13 | 14 | 23 | 25 | 29 | 30 | 31 | 33 |
|---|---|---|---|---|---|---|---|---|---|
| $CaCO_3$ | — | — | — | 164,498 | 9,270 | 158,256 | 155,228 | 3,028 | — |
| $CaSO_3.\frac{1}{2}H_2O$ | — | — | — | 372,035 | — | 379,282 | 372,025 | 7,257 | 10 |
| $CaSO_4.2H_2O$ | — | — | — | 67,550 | — | 68,623 | 67,310 | 1,313 | 240 |
| $H_2O$ | 1,845,530 | 13,570 | 1,831,960 | 6,112,465 | — | 6,112,465 | 5,995,512 | 116,953 | 116,953 |
| Total | 1,845,530 | 13,570 | 1,831,960 | 6,716,548 | 9,270 | 6,718,626 | 6,590,075 | 128,551 | 117,203 |
| Temp., °F | 100 | 85 | 110 | 105 | 85 | 105 | 105 | 105 | 85 |

With respect to the process as described in the FIGURE and in the Tables, it is emphasized that the operation of the wet lime or limestone sulfur dioxide scrubber is as close to the ambient temperature as it is normally possible rather than at the adiabatic saturation temperature which is being practiced in the prior art. For example, the normal adiabatic saturation temperature is 125° C. for power plants, or 110 to 160° C. for smelter reverberatory furnaces. Consequently, waste gases which are bing liquor temperature but not equal to it. Thus, in accordance with the present invention, a significant decrease in the maintenance cost of the scrubber allows the operation of the same for a prolonged time, while at the same time as scrubbing liquid one can employ lagoon stored waters with an appropriate liquid recycle such that the liquid return to the wet lime of limestone scrubber is at particular ambient temperature generally (over a year) from 35 to 90° F. Consequently, the temperature of the flue or furnace gases is that which is cooled to the corresponding temperature from 390 to 105° F for the gases coming from the packed tower. It is evident the operations, which are conducted at ambient temperatures, require the cooling of the hot gases coming from a power plant or furnaces to a lower temperature in cold weather than warm weather.

In accordance with the above, the process modifications which have been set forth allow the combustion of high sulfur content coals while at the same time meeting the air quality standards imposed in the various communities. It is fairly evident that if the air quality standards of waste gases are higher, then the use of the wet lime or limestone scrubbers on waste gas with lower sulfur content is equally within the scope of this invention. The maintenance costs are such that the process provides an outstanding alternative to the prior art processes previously described.

Still further, the process modification which cools the waste gases below their adiabatic saturation temperature and thereby reduces scale formation in wet lime and limestone scrubbers opens a further use of these scrubbers in the anticipated further increase of these when employing coal or other fuels having high sulfur content.

What is claimed is:

1. In a process for operating a power plant or reverberatory furnace whereby the flue gases or effluent gases are being treated for removal of sulfur dioxide, and a wet lime or limestone scrubber is used in which scale formation and/or encrustation are encountered, the improvement for avoiding said encrustations and/or scale formation comprising:
cooling said flue or effluent gases to a temperature of less than 105° F.;
contacting said flue or effluent gases with an oxide, hydroxide, or carbonate of calcium, magnesium, or barium in an aqueous liquid as a scrubbing liquor for scrubbing the gas, said scrubbing liquor being at a temperature equal or less than the temperature of the flue or effluent gas, when said liquid leaves the scrubber;
venting the scrubbed gas to atmosphere;
depositing in a lagoon said aqueous solution containing the reaction products of sulfur dioxide with said scrubbing liquor and settling the same therein;
returning a settled liquid from said lagoon and augmenting the same with said oxide, hydroxide, or carbonate of calcium, magnesium, or barium;
and recirculating said augmented liquor to the scrubbing zone.

2. In a process for operating a wet lime or limestone scrubber whereby sulfur dioxide laden gases are being contacted with an aqueous slurry of lime of limestone and in which scrubber scale formation and/or encrustations are encountered, the improvement for avoiding said encrustations and/or scale formation comprising:
introducing into said scrubber a gas containing sulfur dioxide cooled below a temperature from 105° F. to the ambient temperature;
contacting said thus cooled gases with a counter-currently introduced scrubbing liquor containing wet lime or limestone whereby the exit temperature of the scrubbing liquor is at a temperature at most equivalent to the incoming gas stream;
removing said slurry containing the reaction product of sulfur dioxide with said lime or limestone of said scrubbing liquor;
settling the reaction components in a lagoon;
and removing liquid therefrom at ambient temperatures, said liquid being augmented by lime or limestone for recirculation to the wet lime or limestone scrubber as the scrubbing liquor.

3. In a process for operating a power plant utilizing coal of high sulfur content, the process comprising the steps of:
combusting said coal in a furnace zone, cooling said combustion gases containing sulfur dioxide to a temperature less than 105° F., introducing said cooled gases in a wet lime or limestone scrubber, contacting said gases with a scrubbing liquor at an ambient temperature wherein the scrubbing liquor exit temperature from said wet lime or limestone scrubber is at most equivalent to the entering temperature of said hot gases in said scrubber and removing the reaction products from said scrubbing liquor while augmenting the scrubbing liquor with lime or limestone for recycling to said wet lime or limestone scrubber, whereby encrusting and scale formation within said scrubber is thereby avoided.

* * * * *